(12) United States Patent
Schneider et al.

(10) Patent No.: US 8,312,959 B1
(45) Date of Patent: Nov. 20, 2012

(54) VEHICLE STEERING SYSTEM TRANSMISSION

(75) Inventors: Dean Schneider, Washington, MI (US); Alexander Serkh, Troy, MI (US); Thomas M. Lovin, Troy, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 13/528,437

(22) Filed: Jun. 20, 2012

Related U.S. Application Data

(63) Continuation-in-part of application No. 13/353,534, filed on Jan. 19, 2012, and a continuation-in-part of application No. 13/293,212, filed on Nov. 10, 2011.

(51) Int. Cl.
*B62D 5/04* (2006.01)

(52) U.S. Cl. ............................ 180/444; 180/443; 474/32

(58) Field of Classification Search .................. 180/443, 180/444, 446; 474/32, 33, 36
See application file for complete search history.

(56) References Cited

U.S. PATENT DOCUMENTS

| | | | | |
|---|---|---|---|---|
| 4,403,979 A | * | 9/1983 | Wujick | 474/153 |
| 4,840,608 A | * | 6/1989 | Araki et al. | 474/205 |
| 5,209,705 A | * | 5/1993 | Gregg | 474/204 |
| 6,685,785 B1 | * | 2/2004 | Morris et al. | 156/137 |
| 7,237,647 B2 | * | 7/2007 | Nakamura et al. | 180/444 |
| 7,490,696 B2 | * | 2/2009 | Saruwatari et al. | 180/444 |
| 7,887,446 B2 | * | 2/2011 | Hironaka | 474/205 |
| 7,905,317 B2 | * | 3/2011 | Kruttschnitt et al. | 180/444 |
| 2002/0119854 A1 | * | 8/2002 | Mohr et al. | 474/237 |
| 2005/0121251 A1 | * | 6/2005 | Ueno et al. | 180/444 |

FOREIGN PATENT DOCUMENTS

| JP | 2000320626 | * 11/2000 |
|---|---|---|
| JP | 1113840 | * 11/2011 |

OTHER PUBLICATIONS

"Noise and Life of Helical Belt Drive", Ueda et al., Transactions of the ASME, vol. 121, Jun. 1999.*

* cited by examiner

*Primary Examiner* — Ruth Ilan
*Assistant Examiner* — Marc A Scharich
(74) *Attorney, Agent, or Firm* — J. A. Thurnau, Esq.; P. N. Dunlap, Esq.

(57) ABSTRACT

A vehicle steering system transmission comprising a housing, an input shaft journalled to the housing, an electric motor connected to the housing and coupled to the input shaft, an output shaft journalled to the housing, the input shaft and the output shaft coupled by a first pair of sprockets having a first belt trained therebetween and having a first ratio, the first belt and first pair of sprockets comprising a helical tooth configuration, the input shaft and the output shaft coupled by a second pair of sprockets having a second belt trained therebetween and having a second ratio, and the input shaft and the output shaft coupled by a third pair of sprockets having a third belt trained therebetween and having a third ratio.

5 Claims, 14 Drawing Sheets

VEHICLE STEERING SYSTEM TRANSMISSION

REFERENCE TO RELATED APPLICATIONS

This continuation-in-part application claims priority from pending US non-provisional continuation-in-part application Ser. No. 13/353,534 filed Jan. 19, 2012 which claims priority from pending U.S. non-provisional patent application Ser. No. 13/293,212 filed Nov. 10, 2011.

FIELD OF THE INVENTION

The invention relates to a vehicle steering system transmission, and more particularly to a vehicle steering system transmission comprising an input shaft and an output shaft coupled by a first pair of sprockets having a ratio, a second pair of sprockets having a ratio and the third pair of sprockets having a ratio.

BACKGROUND OF THE INVENTION

Electric power assist steering systems (EPAS) have been around since the 1960's. Hydraulic power assist steering has traditionally dominated the market. Hydraulic systems have high parasitic energy loss when the hydraulic pump is pumping, but power assist is not required. Early attempts to eliminate this parasitic loss involved fitting an electric motor to the pump and only driving the pump when necessary.

Electric hydraulic assisted power steering systems use an electric motor to drive a hydraulic pump to feed a hydraulic power steering system. These systems are an intermediate step by the industry and their use will likely fade with the increased use of SPAS. EPAS systems allow realization of reduced noise, reduced energy use, active safety features, and adjustability to meet driving conditions. However, the use of these systems has remained limited until recent C.A.F.E. requirements became more difficult to meet. This is driving automotive manufactures to turn to EPAS systems more and more in an effort to improve vehicle fuel economy. SPAS systems eliminate the parasitic losses typically found in hydraulic assist power steering systems. System manufacturers such as Nexteer make claims of 6% fuel economy improvements.

For example, one difficulty that slowed implementation of EPAS systems was meeting the power requirement with a 12 volt electric motor. Recently systems have been developed that successfully solve this problem. Further, all SPAS systems require a control module to sense driver input and control the electric motor to provide the desired assist. The control module measures driver input torque and uses this to determine the amount of assist required. Assist can be tuned to meet the drivers need depending on driving conditions. The system can even have a tunable "feel" available to the driver.

Even though the main driver for automotive SPAS is fuel economy improvement, SPAS has additional benefits. The system can make steering assist available even when the vehicle's engine is not running. It also enables the use of the automatic parallel parking systems available today.

There are two main types of EPAS systems; column assist and rack assist. Rack assist SPAS systems have an electric motor that is connected to the steering rack. The electric motor assists the rack movement usually through driving a lead screw mechanism. Column assist EPAS systems have an electric motor connected to the steering column. The electric motor assists the movement of the column shaft usually through a worm gear type arrangement. One advantage of these types of systems is the electric motor can be placed in the passenger compartment freeing up valuable space under the hood. This also keeps any sensitive electrical components out of the harsh under hood environment.

Worm drive column assist systems are usually used in small cars where the assist power requirements are lower than what would be needed in a large heavy vehicle. These systems are limited by the speed of the steering wheel and the ratio of the worm drive. The steering wheel at its fastest speed rotates relatively slowly at approximately 60 rpm. With a 60 rpm speed of the steering wheel and a worm drive ratio of 15:1, the max speed of the electric motor would only be 900 rpm. Worm drives are limited to ratios under 20:1 because ratios higher than that cannot be back-driven.

The steering system must be able to be operated with no power. This requires the worm drive be able to operate with the gear driving the worm (back-driven). Having a low motor speed and limited ratio worm drive causes the need for high torque motor. Even with a high torque motor, these types of systems have not been made successful on heavy vehicles. Small vehicles are light and require less steering effort thus enabling the use of these systems. Worm drive column assist EPAS systems are the lowest cost systems and thus also lend themselves to smaller less expensive vehicles.

Typical steering systems with worm drive assists are limited in their efficiency. EPAS systems must be designed to operate when there is no power available. Due to the nature of worm drive's tendency to lock up during back driving when ratios exceed approximately 20:1, worm drive EPAS systems efficiency is not greater than approximately 85% and nearer to 65% during back-driving conditions.

Today there are no column assist EPAS systems commonly available that use anything other than a worm drive to facilitate the assist. These column systems are unable to provide enough assist for large heavy vehicles.

Representative of the art is U.S. Pat. No. 7,887,446 which discloses a helically-toothed-belt transmission device. A backlash "D" is selectively enlarged in a helically-toothed-belt transmission device that transmits drive force by meshing between a helically toothed belt and a helically toothed pulley, that is, a tooth helix angle "θ" is set in a range of $-0.2 \leq 1 - W x \theta / Pt \leq 0.75$, with "Pt" being a tooth pitch, "θ" a tooth helix angle, and W the width of the belt. The backlash "D" between the helically toothed belt and the helically toothed pulley is set to be 1.6%-3% of the tooth pitch "Pt".

What is needed is a vehicle steering system transmission comprising an input shaft and an output shaft coupled by a first pair of sprockets having a ratio, a second pair of sprockets having a ratio and the third pair of sprockets having a ratio. The present invention meets this need.

SUMMARY OF THE INVENTION

The primary aspect of the invention is to provide a vehicle steering system transmission comprising an input shaft and an output shaft coupled by a first pair of sprockets having a ratio, a second pair of sprockets having a ratio and the third pair of sprockets having a ratio.

Other aspects of the invention will be pointed out or made obvious by the following description of the invention and the accompanying drawings.

The invention comprises a vehicle steering system transmission comprising a housing, an input shaft journalled to the housing, an electric motor connected to the housing and coupled to the input shaft, an output shaft journalled to the housing, the input shaft and the output shaft coupled by a first pair of sprockets having a first belt trained therebetween and having a first ratio, the first belt and first pair of sprockets comprising a helical tooth configuration, the input shaft and the output shaft coupled by a second pair of sprockets having a second belt trained therebetween and having a second ratio, and the input shaft and the output shaft coupled by a third pair of sprockets having a third belt trained therebetween and having a third ratio.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 8 is a schematic of a steering system.

DETAILED DESCRIPTION OF THE PREFERRED EMBODIMENT

Figure 1:
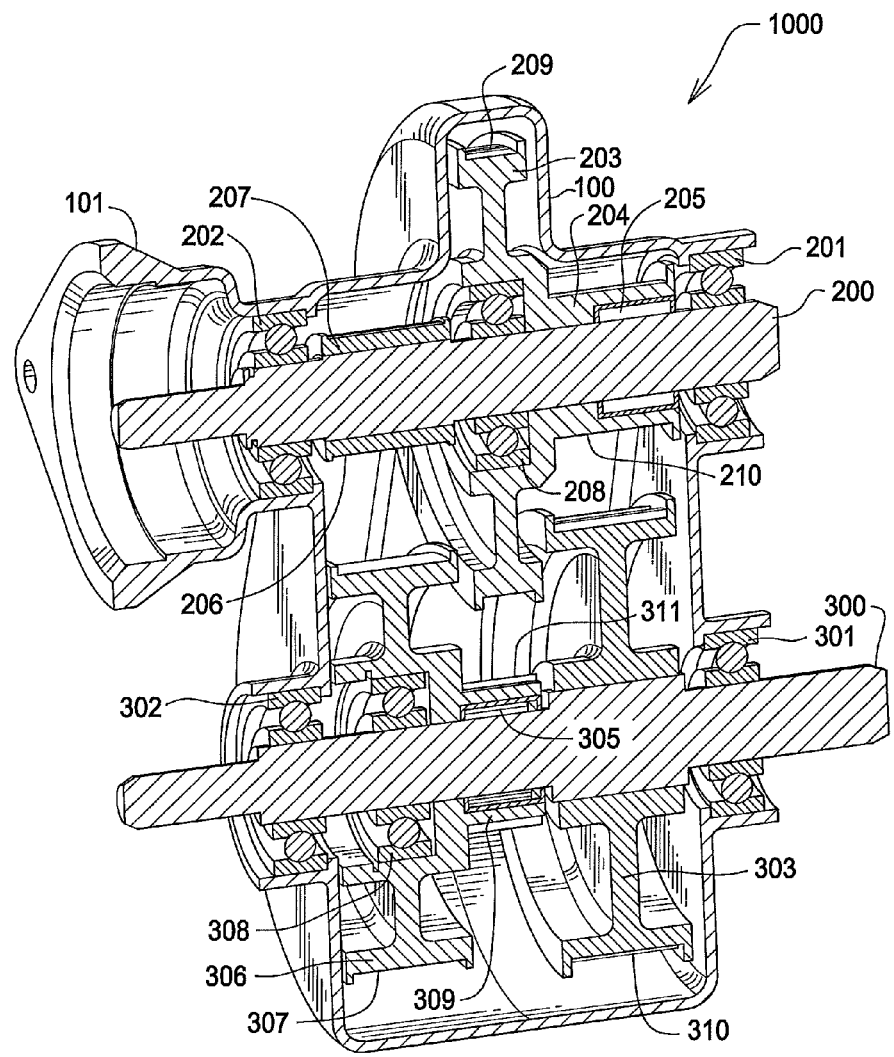
FIG. 1 is a cross sectional view of the inventive transmission.

FIG. 1 is a cross sectional view of the inventive transmission. The inventive transmission 1000 comprises a housing 100. Contained within the housing is an input shaft 200. The input shaft is coupled to an electric motor 201. The electric motor is a 12 V DC motor known in the art. The electric motor is attached to the housing at a motor mount 101.

Input shaft 200 is journalled to the housing by a first bearing 201 and a second bearing 202.

Sprocket 206 is press fit to shaft 200. Sprocket 206 comprises a toothed surface 207 for engaging a toothed belt 400.

An intermediate sprocket 203 is journalled to shaft 200 by a bearing 208 and a needle bearing 205. Sprocket 203 freely rotates on shaft 200. Intermediate sprocket 203 is connected to sprocket 204, in other words they are a single unit. Intermediate sprocket 203 comprises a toothed surface 209, and sprocket 204 comprises a toothed surface 210, each for engaging a toothed belt. The diameter of toothed surface 209 is greater than a diameter of toothed surface 210. The diameter of sprocket 206 is less than the diameter of sprocket 204. Of course, any combination of diameters is possible in order to achieve the desired ratio.

An output shaft 300 is journalled to the housing by a first bearing 301 and a second bearing 302.

Sprocket 306 is journalled to output shaft 300 by a bearing 308 and a needle bearing 305. Sprocket 306 comprises a toothed surface 307 for engaging a toothed belt. Sprocket 306 is connected to sprocket 309 which also comprises a surface for engaging a toothed belt. The diameter of sprocket 306 is greater than the diameter of sprocket 309. The diameter of sprocket 306 is less than the diameter of sprocket 303. Of course, any combination of diameters is possible in order to achieve the desired ratio for each pair of sprockets.

Sprocket 303 is press fit to shaft 300. Sprocket 303 comprises a toothed surface 310 for engaging a toothed belt.

A toothed belt 400 is trained between the first pair of sprockets, namely, sprocket 206 and sprocket 306. The ratio between sprocket 306 and 206 is 3.4:1. Toothed belt 400 comprises a helical belt which is more fully described elsewhere in this specification.

A toothed belt 500 is trained between the second pair of sprockets, namely, sprocket 203 and sprocket 309. The ratio between sprocket 203 and 309 is 3.0:1. A toothed belt 600 is trained between the third pair of sprockets, namely, sprocket 204 and sprocket 303. The ratio between sprocket 303 and 204 is 3.0:1. Toothed belt 500 and toothed belt 600 do not comprise a helical belt as is the case for toothed belt 400.

The dimensions given in this specification are examples only and are not intended to limit the scope of the inventive transmission.

Helical Belt.

Figure 9:
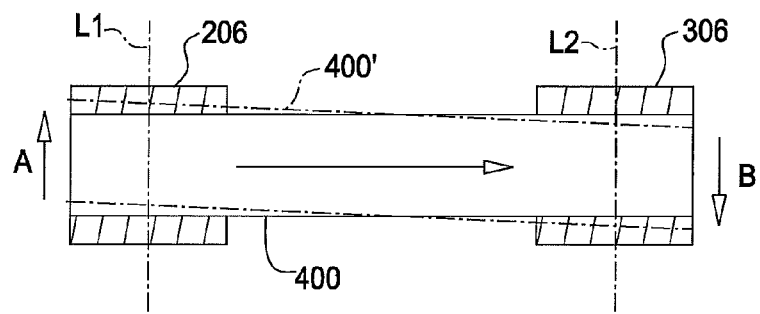
FIG. 9 schematically shows an arrangement of an endless helically-toothed belt installed on a helically-toothed pulley, which is viewed from a back side of the belt.

Helical belt 400 and helical sprockets 206, 306 are described next. FIG. 9 schematically shows an arrangement of an endless helically-toothed belt installed on a helically-toothed pulley, which is viewed from a back side of the belt. As shown in the figure, the helically-toothed belt 400 is entrained around a pair of helically-toothed pulleys 206 and 306 which are rotatable about respective axes "L1" and "L2". For example, the helically-toothed pulley 306 is a drive pulley and the rotational power of the helically-toothed pulley 306 is transmitted to the driven pulley 206 via the helically-toothed belt 400. In FIG. 9, the helically-toothed belt 400 described by a solid line indicates an arrangement of the helically-toothed belt immediately after the belt installation. On the other hand, a phantom line indicated by a reference number 400' represents a position of the helically-toothed belt 400 after the belt-drive transmission device is driven.

Immediately after the helically-toothed belt 400 is installed on the helically-toothed pulleys 206 and 306 (before the belt-drive transmission device is driven), teeth traces of the helically-toothed belt 400 coincide with teeth traces of the helically-toothed pulleys 206 and 306, so that the longitudinal direction of the helically-toothed belt 400 is made substantially perpendicular to the rotational axes "L1" and "L2" of the helically-toothed pulleys 206 and 306. However, when the helically-toothed pulley 306 or the drive pulley is driven and the load bears upon the helically-toothed belt 400, the helically-toothed belt 400 skids along the teeth traces of the pulleys, thus a thrust occurs. Namely, when the belt-drive transmission device is driven, the helically-toothed belt 400 skids on the helically-toothed pulley 206 in the "A" direction along the rotational axis "L1", and skids on the helically-toothed pulley 306 in the "B" direction, which is opposite to the "A" direction, along the rotational axis "L2", as shown in FIG. 9. Thereby, the helically-toothed belt 400, represented by the solid line, is moved to the position 10' which is represented by the phantom line. This type of thrust is prominent when the belt-drive transmission device is operated under a heavy load or at a high-speed rotation.

Figure 10:
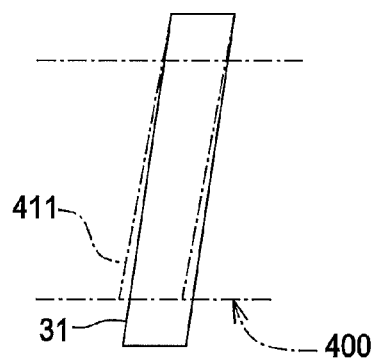
FIG. 10 is a schematic enlarged view showing the relations between the teeth traces of the helically-toothed pulley and the teeth traces of the helically-toothed belt engaged thereto.

FIG. 10 is a schematic enlarged view showing the relations between the teeth traces of the helically-toothed pulley 306 and the teeth traces of the helically-toothed belt 400 engaged thereto, after the belt-drive transmission device operation is started or after thrust has occurred. As shown in the figure, a tooth trace 411 of the helically-toothed belt 400 is inclined against a tooth trace 31 of the helically-toothed pulley 306 to the amount of angles where the belt has slanted by the skid, so that the tooth trace 411 slips out of the tooth trace 31. When a gap is induced between the tooth trace of the helically-toothed belt 400 and the tooth trace of the helically-toothed pulley 306, inadequate contact is generated between the pulley and the belt. For example a shoulder (a part connecting a working flank and a tooth tip cylinder) of the pulley contacts a mating flank of the belt, or the like. Such inadequate engagement generates noise and vibration. Note that, as can be seen from FIG. 9, the same phenomena are induced on the helically-toothed pulley 206.

Figure 11:
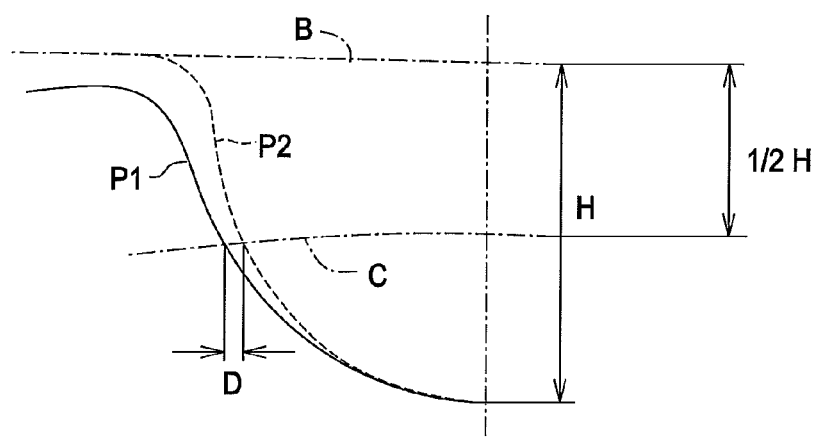
FIG. 11 illustrates half tooth profiles of the belt and pulley.

In order to solve such problems, backlash between the belt and the pulley is selectively enlarged in a first embodiment of the present invention, so as to prevent inadequate contact between the pulley teeth and the belt teeth and reduce noise and vibration. Referring to FIG. 11, the definition of backlash in the present embodiment will be explained.

FIG. 11 illustrates half tooth profiles of the belt and pulley. A solid curve "P1" describes the tooth profile of the pulley and a broken curve "P2" describes the tooth profile of the belt. A straight line "B", a dash-dotted line, is the base line on a bottom land of the belt, so that a tooth height "H" is defined by the height from the base line B to the tip of the belt tooth. Further, is an arc "C", which is also indicated by a dash-dotted line, is an arc that passes through a point that is distant from the base line "B" by a half of the distance of the tooth height "H" (1/2H), and its center coincides with the center of the pulley. Namely, the diameter of the arc "C" is equivalent to a value where the tooth heights "H" are subtracted from the outside diameter of the pulley. The backlash between the belt and the pulley is defined by the distance "D" between the pulley tooth and the belt tooth at a position along the arc "C" (the distance between the intersection of the curve "P1" and the arc "C", and the intersection of the curve "P2" and the arc "C").

Figure 12:
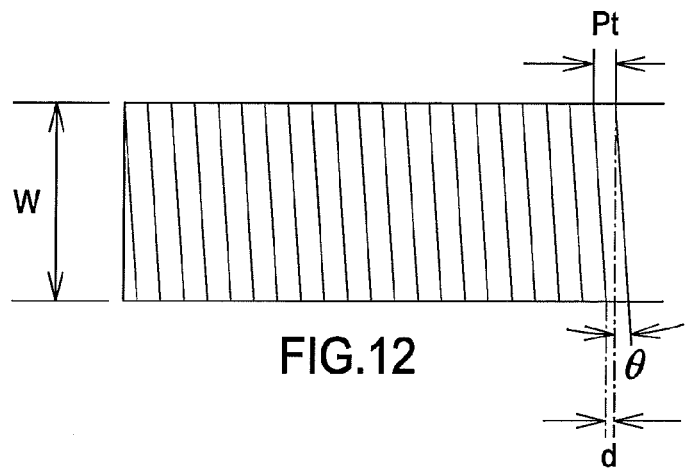
FIG. 12 illustrates an angle of the helical tooth applied to the endless belt.

Next, referring to FIG. 12, an angle of the helical tooth applied to the endless belt of the first embodiment will be explained. FIG. 12 is a part of a schematic development of the helically-toothed belt 400, which is applied to the first embodiment. The teeth traces of the helically-toothed belt 400 are represented by the slanted solid lines which lie in the lateral direction of the belt. Here, the pitch of the belt teeth is denoted by "Pt" and the width is denoted by "W". Further, when denoting an angle (tooth helix angle) between the line in the lateral direction of the belt (or the line perpendicular to the belt longitudinal direction) and the tooth trace as "θ", a space "d" between the end of the first tooth engagement and the beginning of the neighboring second tooth engagement are represented by d=Pt−Wxθ, using the pitch "Pt", the belt width "W", and the tooth helix angle "θ". In the first embodiment, the tooth helix angle "θ" is set so as to satisfy $$-0.2 \leq d/Pt = 1 - W\times\theta/Pt \leq 0.75$$

In a conventional helically-toothed-belt transmission device, although the backlash "D" is set to about 1.5% with respect to the tooth pitch "Pt", the backlash "D" of the helically-toothed-belt transmission device of the first embodiment, is set in a range of 1.6% to 3% (D/Pt×100) of the tooth pitch "Pt".

Namely, in the helically-toothed-belt transmission device of the first embodiment, an inadequate contact between the teeth of the pulley and the belt is prevented, even when thrust is induced on the belt when a heavy load is placed upon the belt during operation, by setting the backlash "D" widely (wide backlash), such as at 1.6% to 3% of the tooth pitch "Pt". Further, this is particularly effective for the tooth helix angles "θ" that satisfy −0.2≦d/Pt≦0.75. Namely, over a wide range of tooth helix angles "θ" (even for a small angle which is not very effective for a compressible tooth profile), the noise and the vibration can be reduced. As described above, according to the first embodiment, noise and vibration are effectively reduced for the helically-toothed-belt transmission device which is driven under a heavy load or at a high-speed rotation.

Figure 13:
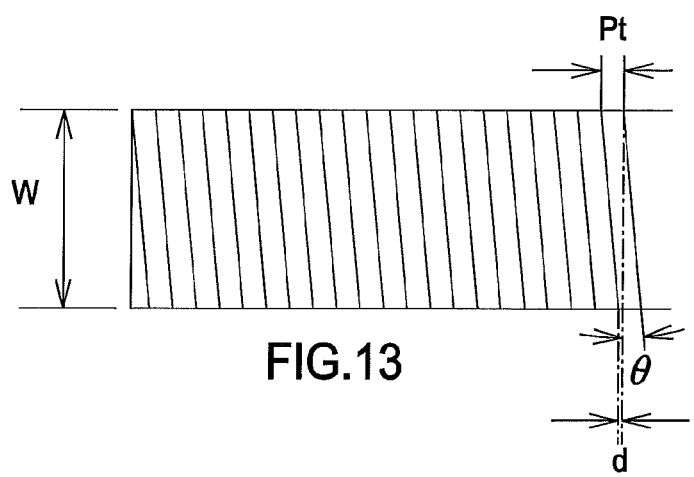
FIG. 13 illustrates the helically-toothed belt.

Next, with reference to FIG. 13 and FIG. 14, a belt-drive transmission device of a second embodiment of the present invention will be explained. FIG. 13 is part of a schematic development of the helically-toothed belt 400, which is applied to the second embodiment. The teeth traces of the helically-toothed belt 400 are represented by the slanted solid lines which lie in the lateral direction of the belt. Further, FIG. 14 shows a form of a compressible tooth profile applied in the second embodiment.

In the belt-drive transmission belt of the second embodiment, the tooth helix angle "θ" is set in a range of d/Pt=1−W tan θ/Pt≦0. Namely, as shown in FIG. 13, a value of "d" is "0" or negative, so that the engagement of the neighboring second tooth starts before the end of the first tooth engagement (or simultaneously with the end of the engagement).

Figure 14:
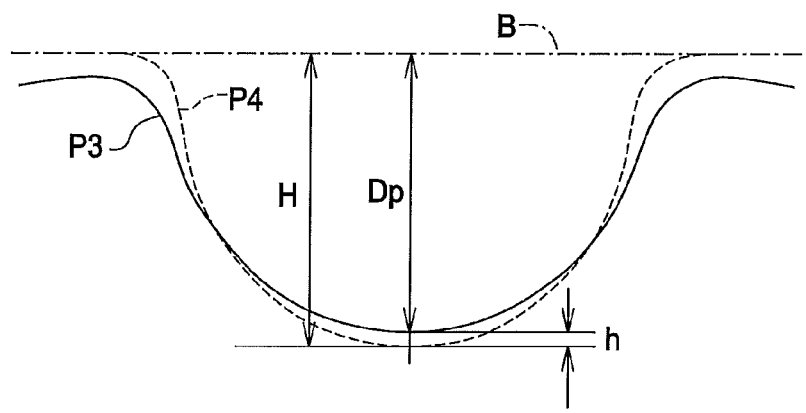
FIG. 14 shows a form of a compressible tooth profile.

In FIG. 14, a curve "P3" indicated by a solid line represents the tooth profile of the helically-toothed pulleys 206 and 306 of the second embodiment, and a curve "P4" indicated by a broken line represents the tooth profile of the helically-toothed belt 400 of the second embodiment. Further, a dash-dotted line "B" represents the base line of the belt when the belt is installed. A groove depth "Dp", a depth from the base line "B" to the tooth root cylinder of the pulley, is smaller than the tooth height "H" of the belt by "h". Therefore, when the helically-toothed belt 400 is entrained about the helically-toothed pulleys 206 and 306, and tension is given, the belt teeth are pressed against the tooth root cylinder of the pulley and compressed. Thereby, positioning accuracy of each of the belt teeth to the pulley grooves is improved, so that a cumulative error between the belt teeth and the pulley teeth is reduced, and the inadequate contact between the belt teeth and the pulley teeth is prevented. Note that, in the second embodiment, the compressibility (h/H×100) of the helically-toothed belt is set within 1.5% to 5%.

As described above, according to the second embodiment, noise and vibration are effectively reduced from the helically-toothed-belt transmission device where the tooth helix angle "θ" is within the range of d/Pt=1−Wθ/Pt≦0, and where the device is driven under a heavy load or at a high-speed rotation, by preventing the inadequate contact between the belt teeth and the pulley teeth. Note that, the helically-toothed-belt transmission device of the second embodiment is particularly effective around a span resonance frequency.

Steering ratio is the ratio of the number of degrees of steering wheel movement per one degree of front wheel movement. A 20:1 steering ratio requires 20 degrees of steering wheel movement to move the front wheels one degree. Most power steering systems have ratios somewhere between 12:1 and 24:1. Ratios of 12:1 are for sports cars. A large pick-up truck may have a ratio near 24:1.

The inventive system consists of a series of belts arranged on two common axis, namely, the input and output shafts. The inventive system provides a torque multiplication ratio of 30.6:1 from the electric motor to the output shaft 300. This is accomplished through three stages of 3.4:1, 3:1 and 3:1.

The initial stage nearest the electric motor 201 is configured for the 3.4:1 ratio. First stage sprockets 206 and 306 utilize a helical sprockets and a helical belt to minimize noise on this high speed belt. The next two sprocket stages utilize a 5 mm pitch toothed belt. The sprocket tooth combinations chosen enable the design to maintain the same center distance for both pitch designs.

Figures 6, 7:
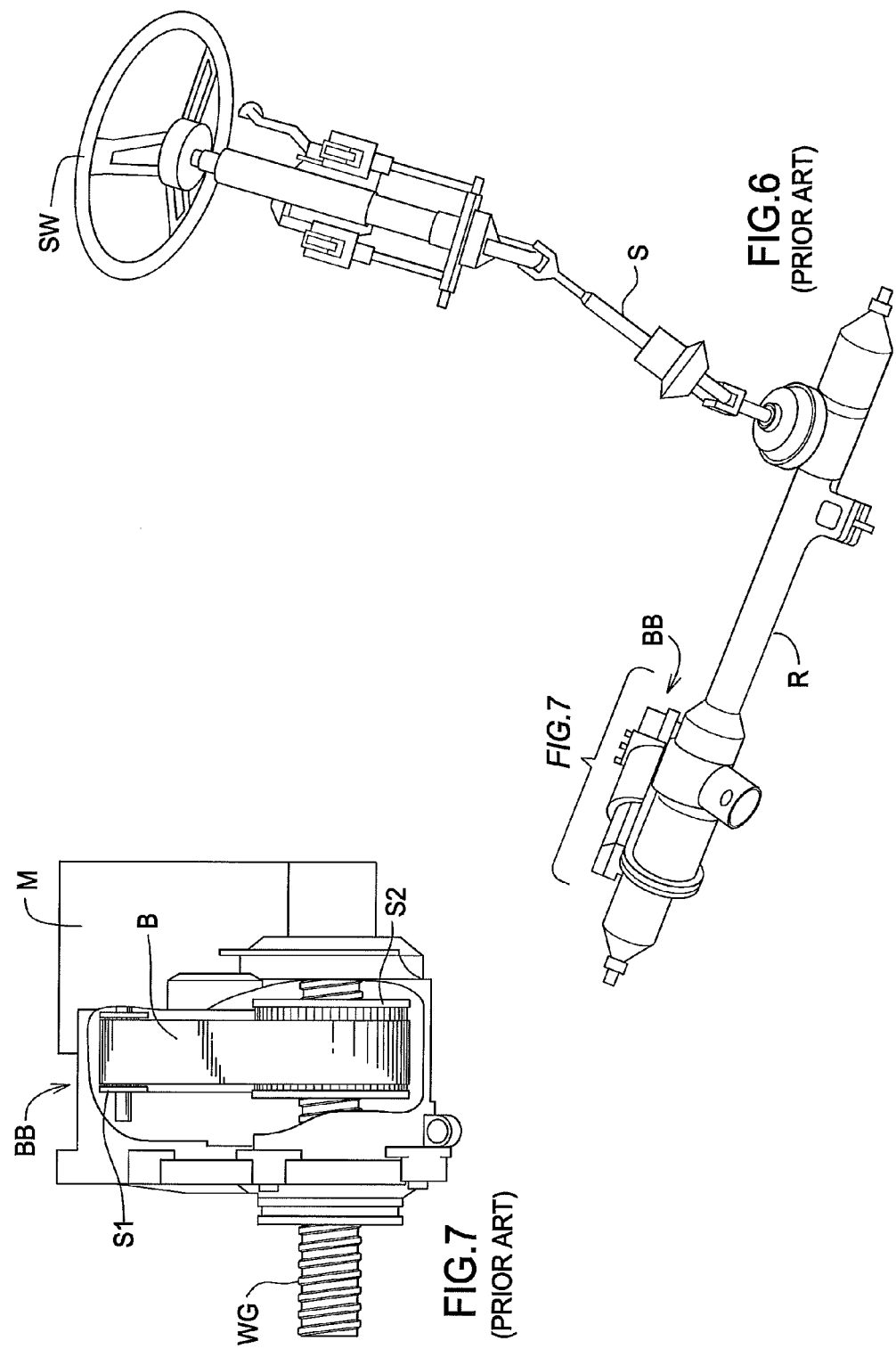
FIG. 6 is a perspective view of a prior art electric power assist rack system.
FIG. 7 is a detail of FIG. 6.

FIG. 6 is a perspective view of a prior art electric power assist rack system. The system typically comprises a steering column (S) and a rack (R). A steering wheel is connected to the steering column by which a driver input is received to steer a vehicle. The rack is also known in the art as a "rack and pinion" steering system.

Rack and pinions are commonly defined by the number of inches of travel of the rack per revolution of the pinion. The exact required rack ratio is dependent on the steering geometry. Steering ratios of 24:1 and 12:1 may have a rack ratio of 1.57:1 and 2.62:1 respectively. The ratio of a rack and pinion can be varied across the rack. This is accomplished through altering the profile of the teeth of the rack along the rack. This changes the contact radius with the pinion. Changing the contact radius changes the amount of rack travel per turn of the pinion. This ratio change is limited to a maximum of 15% across the rack.

FIG. 7 is a detail of FIG. 6. The prior art electric power assist steering system comprises a belt (B) driven by an electric motor (M). The belt is trained between two sprockets (S1) and (S2) and drives a worm gear rack (WG). As a driver turns the steering wheel a control module (not shown) receives a signal which then energizes the motor (M) accordingly in order to drive the belt. As the belt rotates, sprocket (S2) drives the worm gear rack axially in order to move the vehicle wheels to steer.

The power required to steer the front wheels of a vehicle is a maximum when the vehicle is not moving. A heavier vehicle requires more power to steer as well. The following is an example calculation of the power required to steer front wheels of a stopped vehicle.

It is necessary to describe a geometry terms as applied to steering systems. The minimum effective radius arm length (A) is the shortest effective distance from the turning center (B) to the tie rod (C). Usually this is taken when the wheels are fully turned. King pin offset (D) is the distance from the centerline of the wheel (E) to the turning center (B). Tire width (F) is the width of the patch of contact between the tire and the road surface.

For the purpose of illustrating the invention, the following information is given:

| Vehicle weight on front axle | 900 Kg | Gs |
| Tire width | 200 mm | B |
| Friction; Tire to road | 0.8 | μ |
| Min effective radius arm for str. | 0.1 m | r |
| King pin offset | 100 mm | e |

The torque M required to steer the wheels can be calculated using the following formula:

$$M = 0.05 * Gs * \frac{1}{\left(1 + \frac{e}{B}\right)} * \frac{B}{200} * \frac{\mu}{0.7}$$

$$M = 336 \text{ Nm}$$

If one assumes the wheel total angular displacement is degrees and it takes 2 seconds to turn the steering wheel from lock to lock, the power requirement can be calculated as follows:

| Wheel angular displacement | 85 deg |
| Time to turn lock to lock | 2 sec |

Then the angular speed of wheels during turning:

$$\omega = \frac{\text{angular displacement}(rev)}{\text{time(sec.)}} * 60 \left(\frac{\text{sec.}}{\text{min}}\right)$$

$$\omega = \frac{\left(\frac{85}{360}\right)}{2} * 60$$

$$\omega = 7.08 \text{ rpm}$$

Power required without any system losses:

$$P = T * \omega * \left(\frac{2\pi}{60}\right)$$

$$P = 336 * 7.08 * \left(\frac{2\pi}{60}\right)$$

$$P = 249 \text{ watt}$$

If it is assumed the vehicle steering system has an efficiency of 70%, the system has an efficiency of 80%, and the worm gear has an efficiency of 80%, the power requirement is:

$$P = \frac{P}{e}$$

$$P = \frac{249}{(0.7 * 0.8 * 0.8)}$$

$$P = 556 \text{ watt}$$

Figure 4:
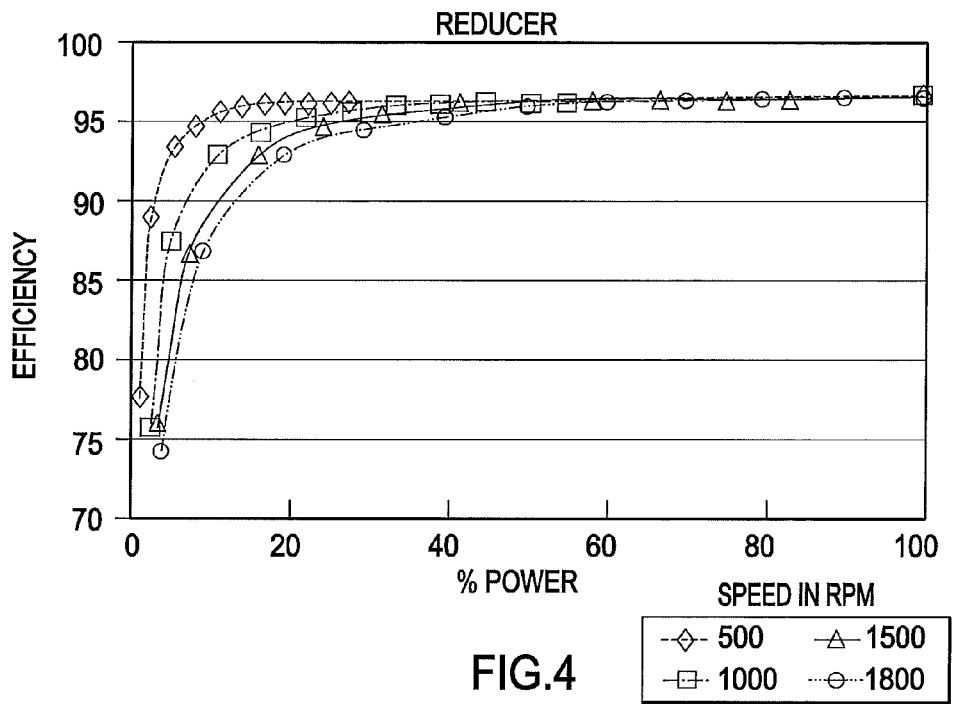
FIG. 4 is a graph of the efficiency of the transmission as a speed reducer.
Figure 5:
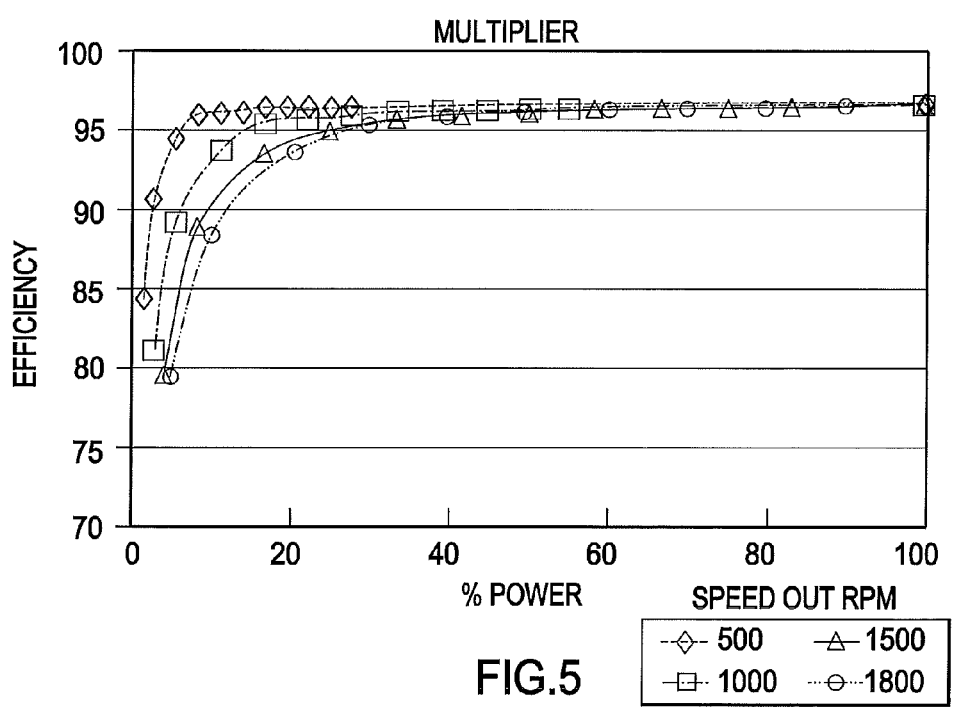
FIG. 5 is a graph if the efficiency of the transmission as a speed multiplier.

On the other hand, the inventive system uses three belt stages. FIG. 4 is a graph of the efficiency of the transmission as a speed reducer. FIG. 5 is a graph if the efficiency of the transmission as a speed multiplier. Using this information as a surrogate for determining the efficiency of the proposed system, it is expected that the inventive system would have efficiencies consistently above 95%.

Operation, Electric Motor Assist Mode.

In operation a driver will turn a vehicle steering wheel which is connected to shaft 300. A typical vehicle system will include a control module to sense driver input and control the electric motor 201 to provide the desired assist through the transmission 1000. For example, the control module measures driver input torque and uses this to determine the amount of assist required from the electric motor 201. Assist can be tuned to meet the drivers need depending on driving conditions.

When assist is being demanded by the control module or ECU, the energized electric motor will apply torque to shaft 200, this in turn provides torque to sprocket 206. During operation input shaft 200 may rotate at up to 1800 RPM. This results in a rotational speed of the output shaft of approximately 60 RPM given a reduction through the transmission of 30.6:1, which represents a typical upper limit. Use of the helical belt 400 and helical sprockets 206, 306 significantly quiet the relatively high speed operation of the belts. Straight toothed belts, such as belt 500 and belt 600, can produce a noise or whine when operated and high speeds. The helical tooth design allows for a more gradual meshing between the teeth of the belt and the sprocket grooves during operation.

The shaft speed is not a significant issue for belt 500 and belt 600 since these operate at the maximum speed of 1800/3.4=529 RPM (belt 400) and 529/3.0=176 RPM (belt 500) and 176/3.0=58 RPM (belt 600).

Toothed belt 400 transmits the force from sprocket 206 to sprocket 306, which in turn applies a torque to sprocket 309. Sprocket 309 drives sprocket 203 through belt 500. Sprocket 204 drives sprocket 303 through belt 600.

Hence, the torque flow during assist mode is from the electric motor 201 to shaft 200 to sprocket 206 to belt 400 to sprocket 306 to sprocket 309 to belt 500 to sprocket 203 to sprocket 204 to belt 600 to sprocket 303 to shaft 300.

Operation, No Assist Mode.

When no electric assist is required by the control module, a driver input will apply a torque to shaft 300. Even though shaft 300 rotates, since electric motor 201 is de-energized it will rotate freely and the system will operate as though no electric motor is present.

Figure 2:
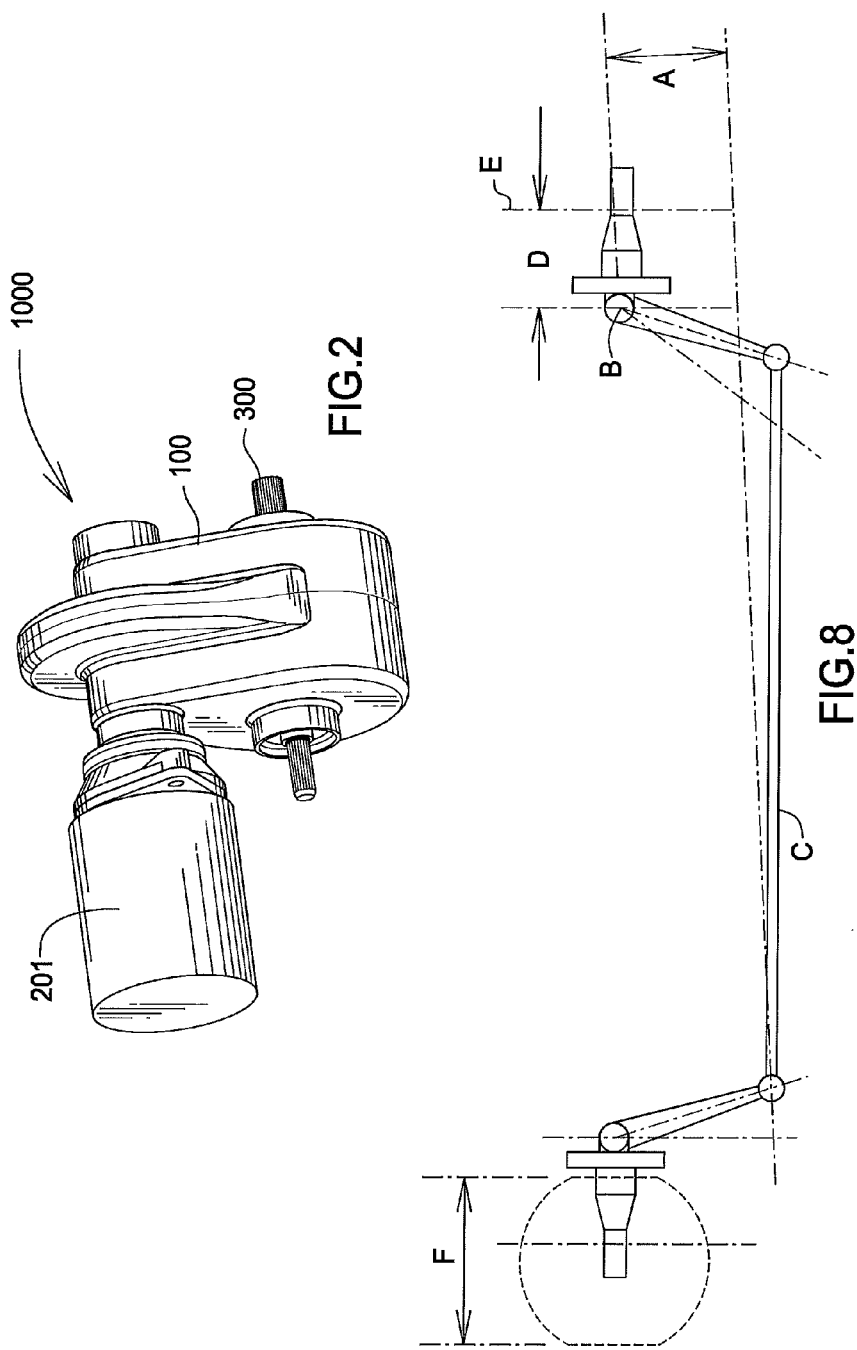
FIG. 2 is a perspective view of the inventive transmission.

FIG. 2 is a perspective view of the inventive transmission. Electric motor 201 is mounted to housing 100. Housing 100 encases the sprockets and belts to protect them from debris.

Figure 3:
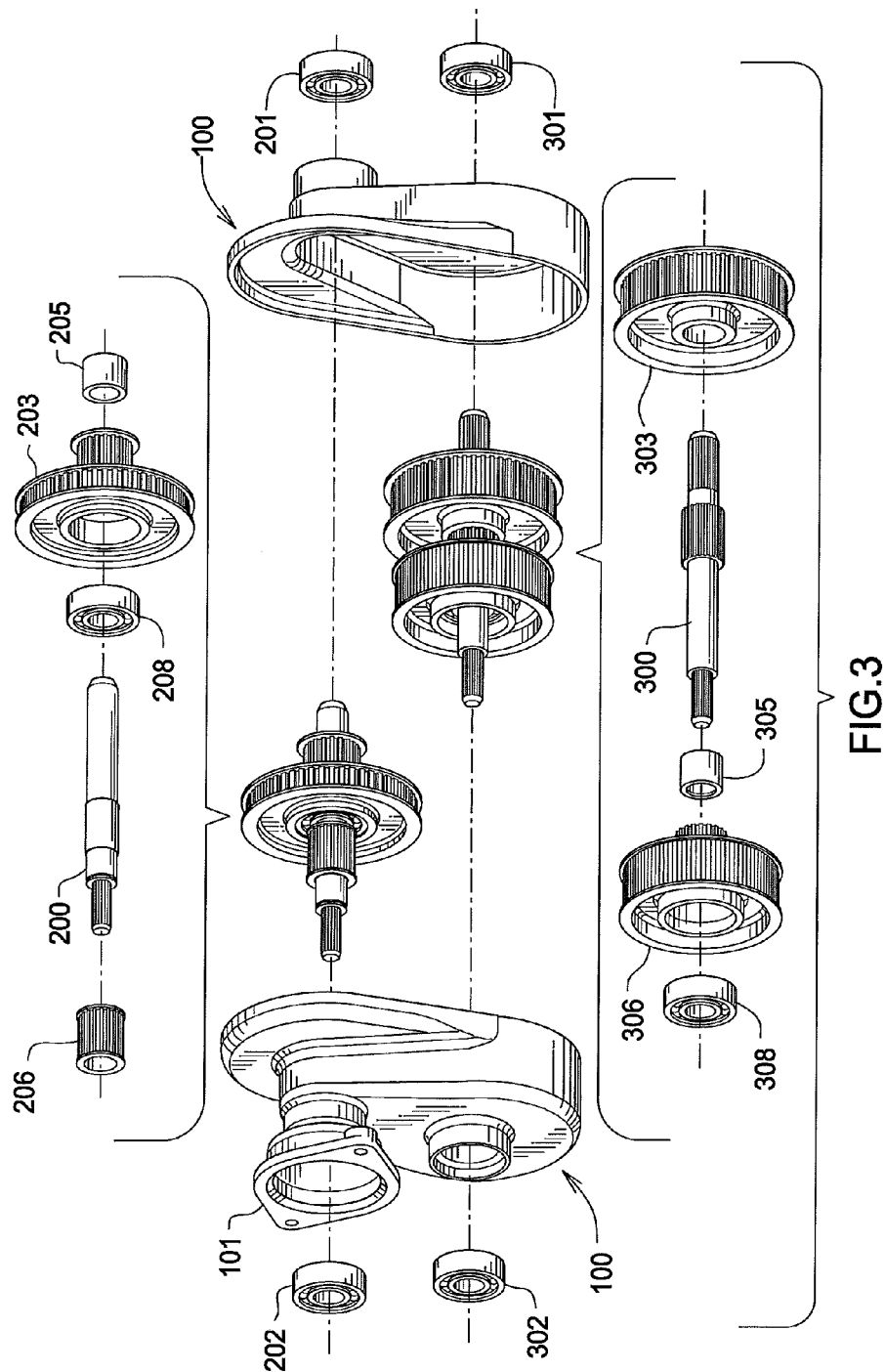
FIG. 3 is an exploded view of the inventive transmission.

FIG. 3 is an exploded view of the inventive transmission. The inventive system is relatively compact. The three belt stages are contained in a single housing 100. The housing is sufficiently compact to allow installation in a vehicle steering system. Depending upon torque requirements, the width of each belt may be increased or decreased as well.

The inventive system is completely scalable. Based on calculations of small car system steering efforts, the worm drive systems provide approximately 80% of the torque needed to steer a stopped vehicle. Existing worm systems provide approximately 30 Nm of assist. The inventive system is designed to provide assist for heavy pick-up truck type vehicles requiring 70 Nm of assist. In order to provide the same level of torque assist as the existing worm drive systems, the belt widths could be narrowed to optimize their design width and the motor torque requirement could be reduced to account for the additional mechanical advantage of the 30.6:1 ratio for the inventive transmission. It is expected the inventive transmission could provide up to approximately 150 Nm of assist.

The belts can also be made wider to provide greater assist for applications such as heavy trucks and buses. It is estimated that a large pickup truck requires approximately 90 Nm to turn the wheels on a stopped vehicle which translates to approximately 70 Nm of assist required.

Figure 15:
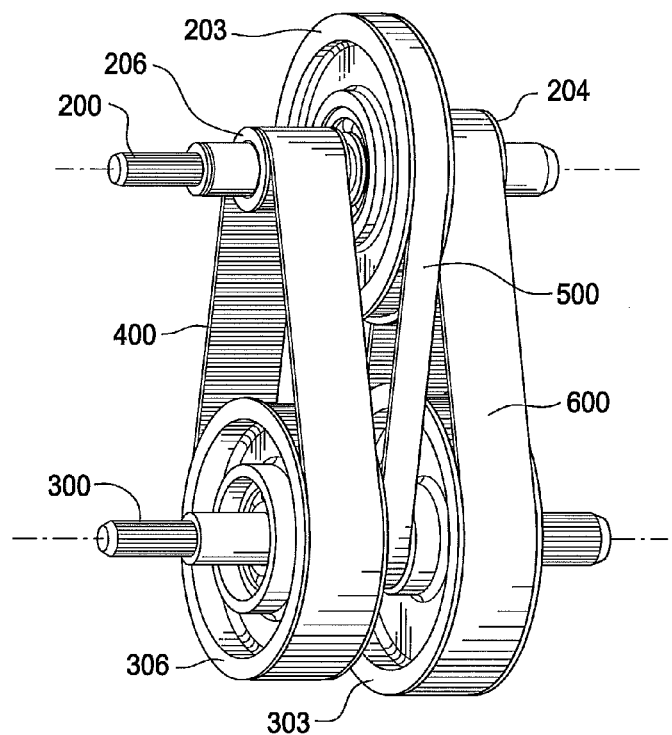
FIG. 15 is a detail of the belt arrangement.

FIG. 15 is a detail of the belt arrangement. A toothed belt 400 is trained between the first pair of sprockets, namely, sprocket 206 and sprocket 306. A toothed belt 500 is trained between the second pair of sprockets, namely, sprocket 203 and sprocket 309. A toothed belt 600 is trained between the third pair of sprockets, namely, sprocket 204 and sprocket 303.

Figure 16:
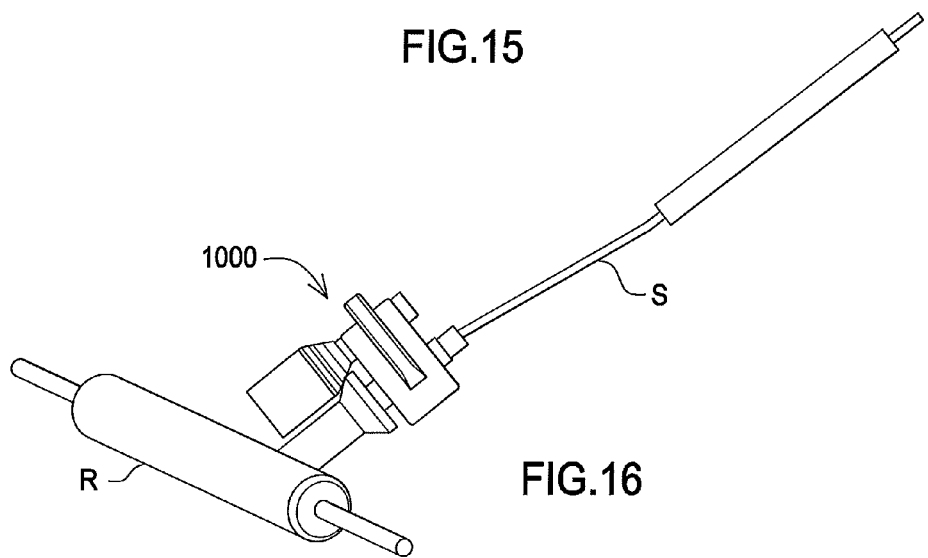
FIG. 16 is a perspective view of the inventive transmission in a steering system.

FIG. 16 is a perspective view of the inventive transmission in a steering system. A steering column (S) is connected to one end of shaft 300. The other end of shaft 300 is connected to an input portion of a steering rack (R). Steering rack (R) is known in the art and is typically included in a system known as a "rack and pinion" steering system. Steering column (S) is typically connected to a steering wheel by which a driver steers the vehicle.

FIG. 17 is an exploded view of an alternate embodiment. In this alternate embodiment the inventive device is configured such that the drive sprockets are on common centers but each sprocket mounting axis is adjustable in order to properly tension each belt. This is accomplished by mounting each sprocket on shafts with offset, or eccentric, diameters. Proper belt tension is important to prevent ratcheting (tooth skip) and to otherwise maximize belt operating life.

In particular, the first eccentric shaft 2000 and the second eccentric shaft 3000 are each configured such that the shaft mounting diameters are on a common axis with an intermediate sprocket mounting diameter which has a second axis which is offset but parallel to the shaft mounting axis. The second eccentric shaft 3000 is configured such that a bore 3001 is on a common axis, that is coaxial with shaft 303. The bore enables output shaft 303 to pass through the second eccentric shaft 3000. Output shaft 303 is coupled to the steering shaft of the vehicle.

Referring to FIG. 17, eccentric shaft 2000 is coupled to the motor 201. Eccentric shaft 2000 is journalled to housing 100 by a bearing 202. Sprocket 203 is journalled to eccentric shaft 2000 by bearing 208 and bearing 250.

Eccentric shaft 3000 comprises a bore 3001. Output shaft 300 is engaged within bore 3001. Sprocket 306 is journalled to eccentric shaft 3000 by a bearing 308 and needle bearing 251. Eccentric shaft 3000 slidingly engages housing 100 so that eccentric shaft 3000 can be rotated during belt tension adjustment.

A lock disk 280 engages eccentric shaft 3000 through a lock disk hole 284. Lock disk 280 is fastened to housing 100 using fasteners 281. Lock disk 280 is used as an adjusting member to rotatably adjust and fix the position of the eccentric shaft 3000 in relation to the housing 100 in order to adjust the belt tension.

A lock disk 290 engages eccentric shaft 2000 through a lock disk hole 294. Lock disk 290 is fastened to housing 100 using fasteners 291. Lock disk 290 is used as an adjusting member to rotatably adjust and fix the position of the eccentric shaft 2000 in relation to the housing 100 in order to adjust the belt tension.

Adjusting the tension of each belt is accomplished by rotating each eccentric shaft 2000, 3000 to thereby adjust the tension in each belt individually. The position of each shaft 2000, 3000 is then fixed by use of each lock disk 290, 280 respectively to maintain the tension. The proper tension for each belt can be determined by known means such as frequency analysis or span deflection. Belt 400 should be tensioned first, followed by the middle belt 500 and then the belt 600 mounted on the motor sprocket 207. Housing 100 can be provided with access holes to allow for tension measurement. Motor 201 is mounted to housing 100 such that it can be moved to adjust the center distance of sprocket 207 to properly tension belt 600.

Fixing the adjusted position of each eccentric shaft is accomplished through the use of each lock disk 280, 290 and fasteners 281, 291, typically bolts. Each lock disk 280, 290 is configured such that it rotates with its respective eccentric shaft. Each lock disk has radial slots 282, 292 that align with bolt mounting bosses 110 in the housing 100. The circumferential spacing of the radial slots 282, 292 and the bolt mounting bosses 110 are such that no matter the rotational position of the lock disk there will always be two bolt holes (bosses) exposed and available for use.

To fix the shaft rotational position, the belt tension is set and then the bolts are driven through the radial slots in each lock disk and into the bolt mounting bosses.

Figure 17A:
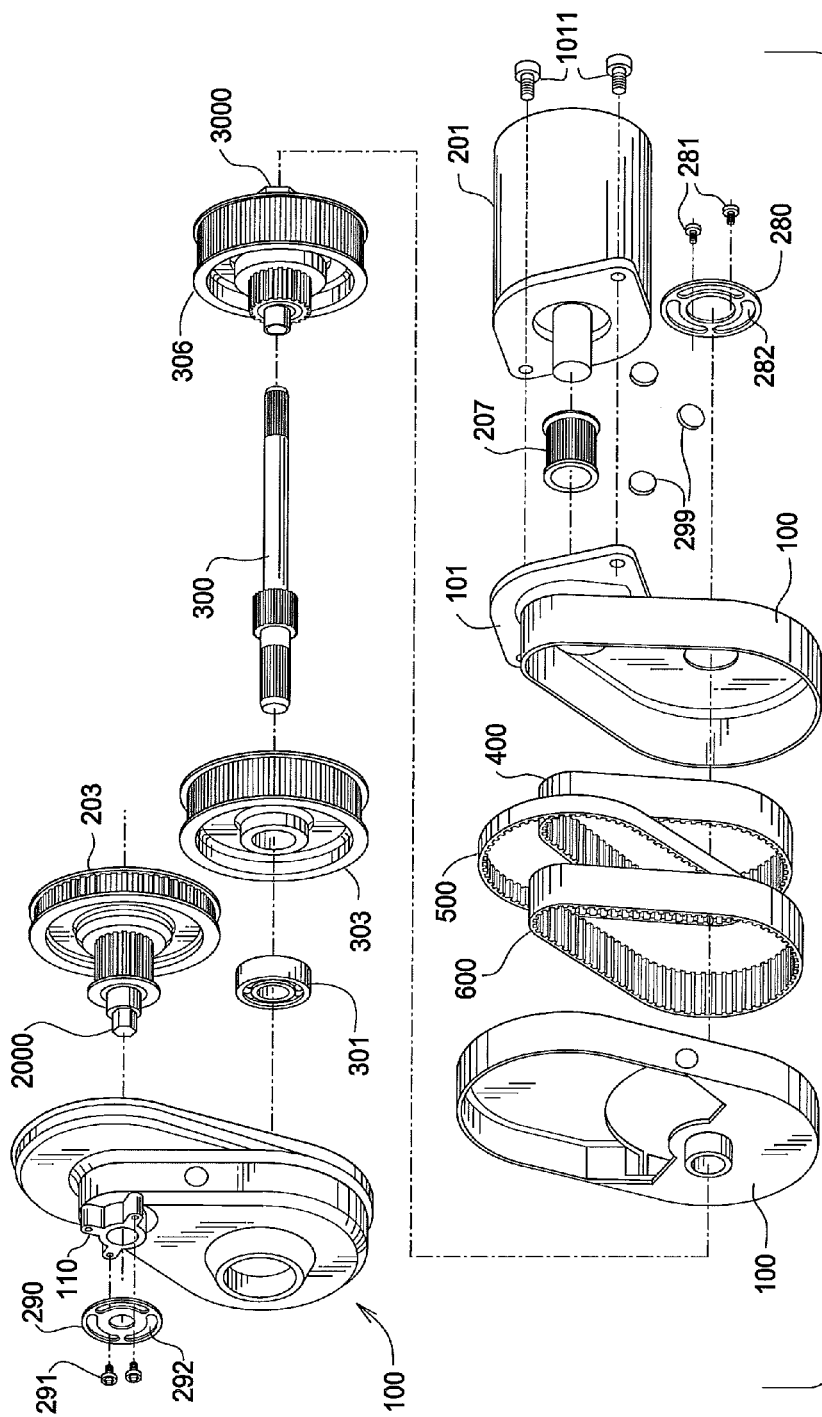
FIG. 17A is an exploded view of an alternate embodiment.
Figure 17B:
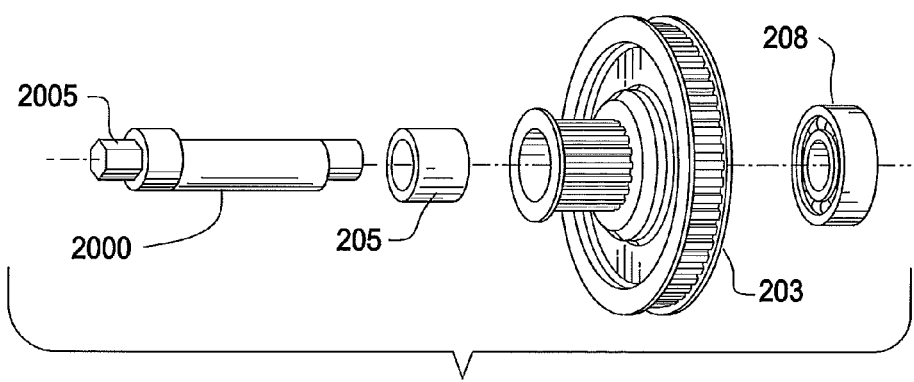
FIGS. 17B and 17C are details of FIG. 17A.
Figure 17C:
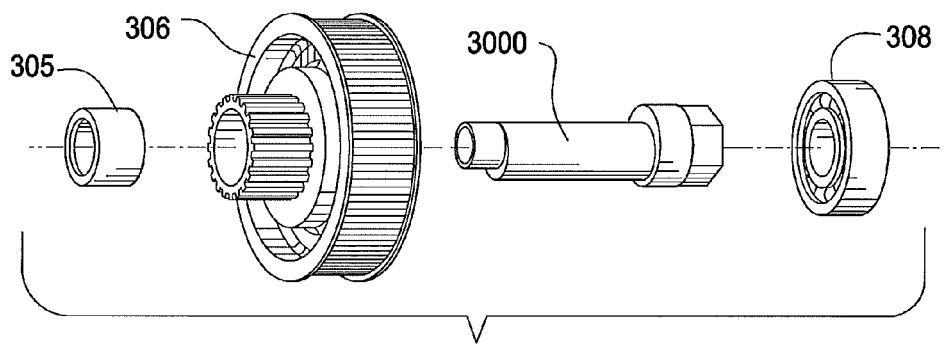

FIGS. 17B and 17C are details of FIG. 17A.

Figure 18:
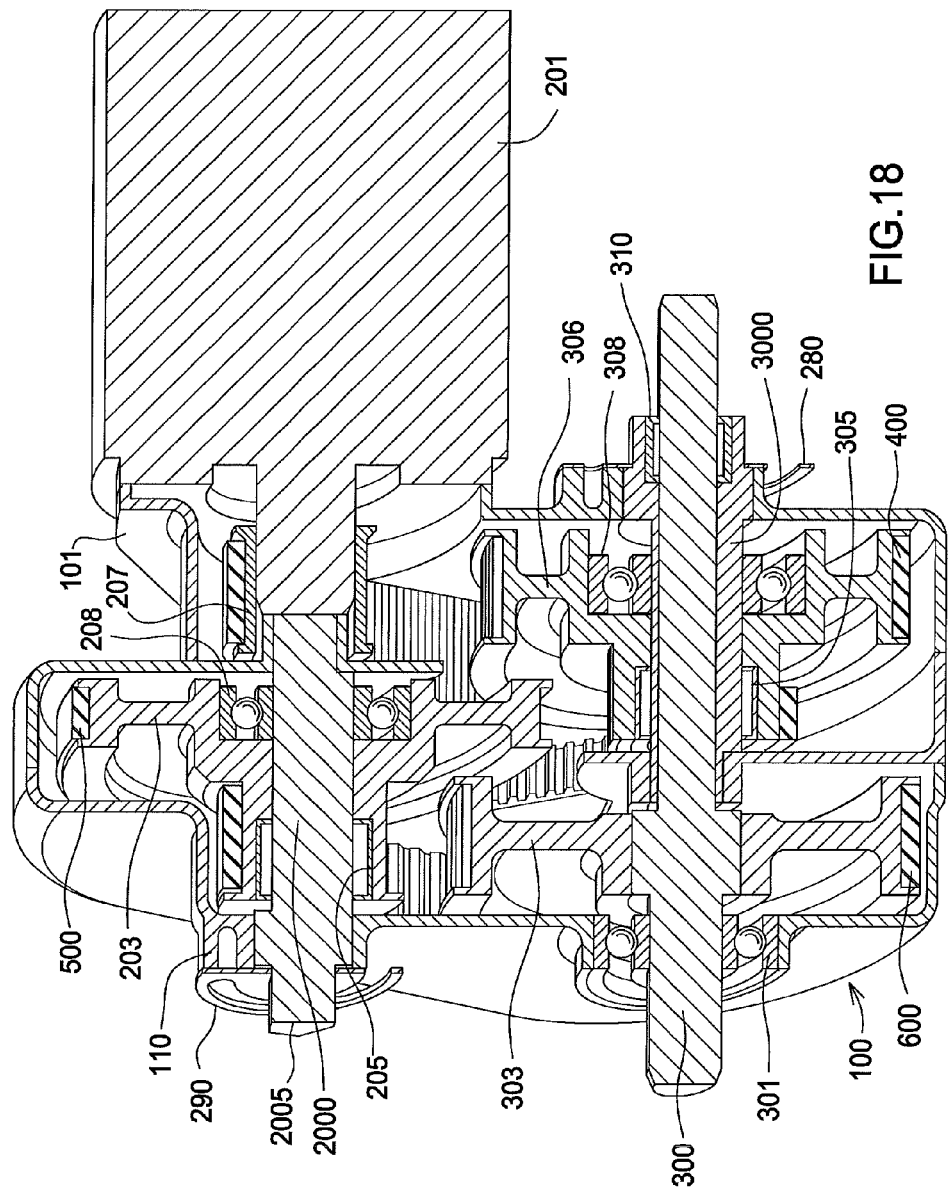
FIG. 18 is a cross-sectional view of the alternate embodiment.

FIG. 18 is a cross-sectional view of the alternate embodiment. Shaft 102 from motor 100 is aligned with eccentric shaft 2000, but they are not mechanically connected, hence, motor shaft 102 rotates independently of eccentric shaft 2000. Tool engaging portion 2005 is disposed at one end of shaft 2000 and is used to engage a tool (not shown) whereby shaft 2000 is rotated.

Each of sprockets 203 and 306 are journalled to their respective eccentric shaft and so each rotates about its respective eccentric shaft 2000, 3000. Each eccentric shaft 2000, 3000 does not rotate during operation of the device. Instead, each eccentric shaft is only rotatable during installation and for the purpose of adjusting belt tension. Each eccentric shaft is then locked in place by its respective lock disk 290, 280.

Sprocket 207 is press fit on the motor shaft. Sprocket 303 is press fit on the output shaft 300. Output shaft 300 is rotatable in a bearing sleeve 310.

Figure 19A:
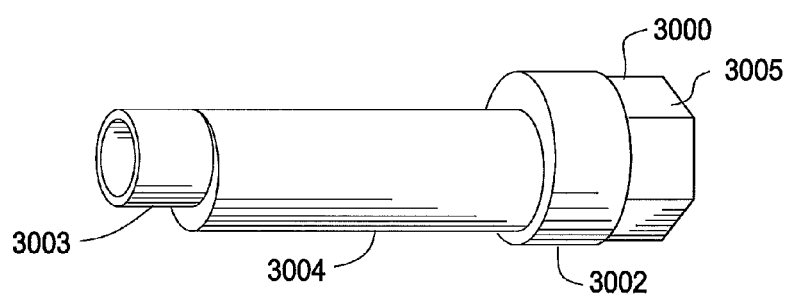
FIG. 19A is a perspective view of eccentric shaft 3000.

FIG. 19A is a perspective view of eccentric shaft 3000. Shaft mounting diameters 3002, 3003 engage housing 100. Bearings 308 and 305 are mounted to sprocket mounting diameter 3004. Tool engaging portion 3005 is disposed at one end of the shaft 3000 and is used to engage a tool (not shown) whereby shaft 3000 is rotated.

Figure 19B:
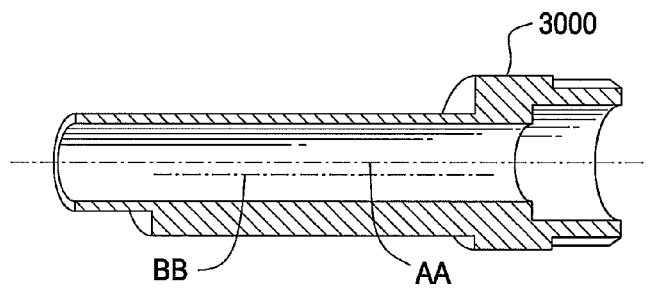
FIG. 19B is a cross sectional view of eccentric shaft 3000.

FIG. 19B is a cross sectional view of eccentric shaft 3000. The shaft mounting diameters 3002, 3003 are centered about an axis A-A. The sprocket mounting diameter 3004 is centered about an axis B-B. Axis A-A is offset or eccentric from axis B-B a predetermined distance.

Figure 20:
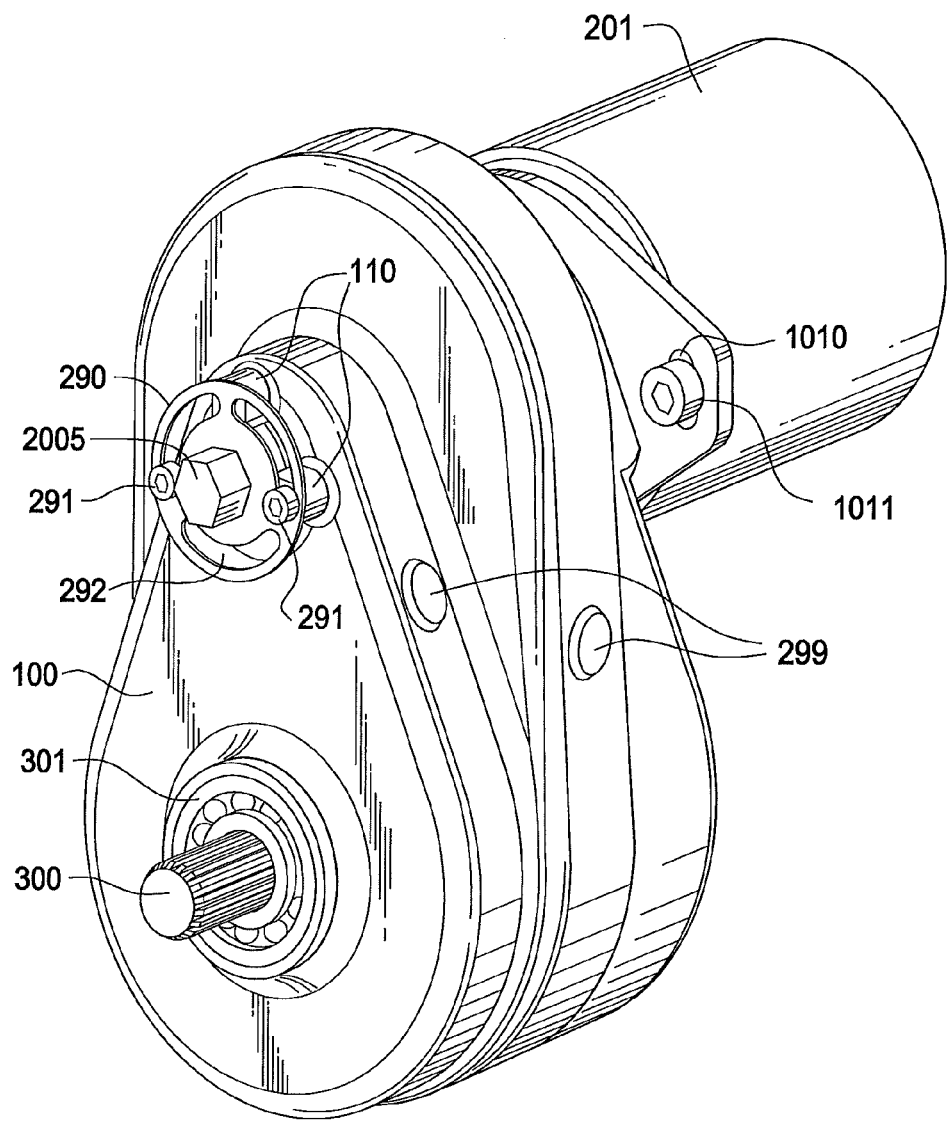
FIG. 20 is an exterior perspective view of the alternative embodiment.

FIG. 20 is an exterior perspective view of the alternative embodiment. Lock disk 290 is fastened to housing 100 using fasteners 291. Each fastener (bolt) is driven through a radial slot 292 into a respective boss 110. Eccentric shaft 2000 engages lock disk 290 at portion 2005. Plugs 299 cover holes 299A that allow access to the belts through the housing 100.

Motor 201 is mounted to mount 101 by fasteners 1011. Each fastener 1011 engages a slot 1010 in mount 101. Slots 1010 allow the position of the motor 201 to be moved as belt tension is adjusted and fixed.

Figure 21:
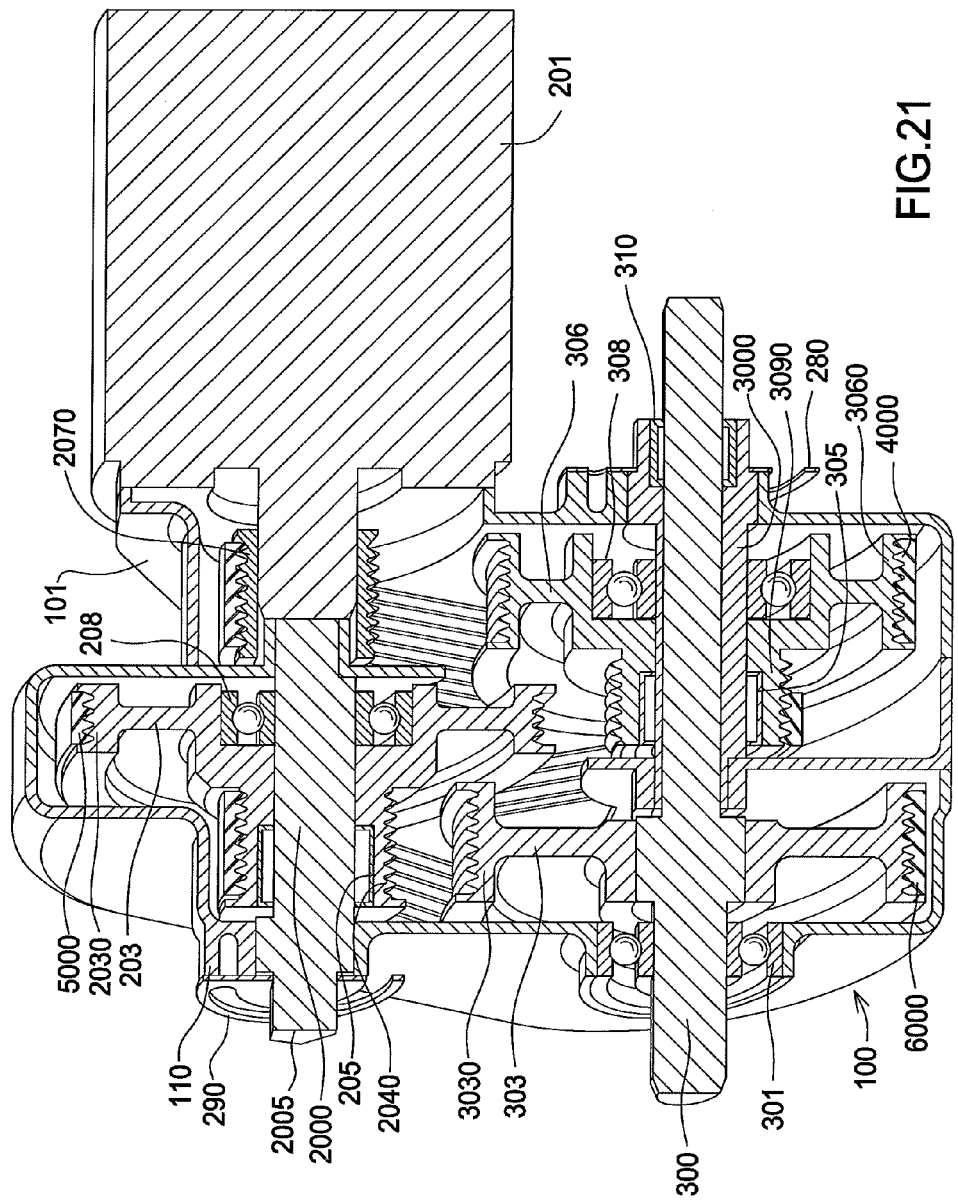
FIG. 21 is a cross sectional view of an alternate embodiment.

FIG. 21 is a cross sectional view of an alternate embodiment. In this embodiment toothed belt 400, toothed belt 500 and toothed belt 600 are replaced with a multi-ribbed belt 4000, multi-ribbed belt 5000 and multi-ribbed belt 6000 respectively. In a multi-ribbed belt, multiple ribs extend in the endless direction of the belt. The corresponding belt engaging surfaces on the sprockets are also changed to accommodate the multi-ribbed belts.

The toothed surface of sprocket 303 is replaced with a multi-ribbed surface 3030. The toothed surface of sprocket 203 is replaced with a multi-ribbed surface 2030. The toothed surface of sprocket 306 is replaced with a multi-ribbed surface 3060. The toothed surface of sprocket 204 is replaced with a multi-ribbed surface 2040. The toothed surface of sprocket 309 is replaced with a multi-ribbed surface 3090.

The toothed surface of sprocket 206 is replaced with a multi-ribbed surface 2060. Belt 4000 engages multi-ribbed surface pulley 2070, which in turn is connected to electric motor 201. No other changes are made to the inventive device. In an alternate embodiment, multi-ribbed surface pulley 2070 is replaced with toothed sprocket 207 and multi-ribbed surface 3060 is replaced with the toothed surface sprocket 306, hence, the transmission comprises a toothed belt 400 trained between sprocket 306 and sprocket 207, and a multi-ribbed belt 5000 between multi-ribbed pulleys 2030 and 3090, and a multi-ribbed belt 6000 trained between multi-ribbed pulleys 2040 and 3030.

In order to accommodate a wide range of applications, the following example belt combinations may be used in the inventive transmission. These example combinations are not intended to limit the various combinations available for use with this transmission. Each number refers to a belt as described in this specification.

Belt Combination Configuration by belt number.

| | | |
|---|---|---|
| 400 | 500 | 600 |
| 400 | 500 | 6000 |
| 400 | 5000 | 6000 |
| 4000 | 5000 | 6000 |
| 400 | 5000 | 600 |
| 4000 | 500 | 600 |
| 4000 | 5000 | 600 |
| 4000 | 500 | 6000 |

Each belt is entrained on the respective toothed sprocket or multi-ribbed pulley combination as described herein, namely, each belt is trained between the noted sprockets or pulleys:

| Belt | |
|---|---|
| | Sprockets |
| 400 | 206-306 |
| 500 | 203-309 |
| 600 | 204-303 |
| | Pulleys |
| 4000 | 2070-3060 |
| 5000 | 2030-3090 |
| 6000 | 2040-3030 |

Please note that although the eccentric adjustment is available as part of the embodiment described in FIG. 21, in an alternate embodiment no eccentric adjustment is required for the shafts. Instead, the first, second and third multi-ribbed belts can be stretched lengthwise a small amount in order to allow each to be trained over the appropriate sprockets. Multi-ribbed belts that can be stretched lengthwise are referred to as "low-modulus" belts and are known in the art.

Although forms of the invention have been described herein, it will be obvious to those skilled in the art that variations may be made in the construction and relation of parts without departing from the spirit and scope of the invention described herein.

We claim:
1. A vehicle steering system transmission comprising:
a housing;
an electric motor adjustably connected to the housing;
a first shaft coaxially engaged about an output shaft;

the electric motor and the first shaft coupled by a first pair of sprockets having a first belt trained therebetween and having a first ratio;

the output shaft journalled to the housing;

the first shaft and a second shaft coupled by a second pair of sprockets having a second belt trained therebetween and having a second ratio, the second belt and second pair of sprockets comprising a multi-ribbed surface; and the second shaft and the output shaft coupled by a third pair of sprockets having a third belt trained therebetween and having a third ratio, the third belt and third pair of sprockets comprising a multi-ribbed surface.

2. The vehicle steering system transmission as in claim 1, wherein the housing comprises an opening for accessing a-belt one of said belts.

3. The vehicle steering system transmission as in claim 1, wherein the electric motor comprises a 12 V DC motor.

4. The vehicle steering system transmission as in claim 1 wherein, the first belt and first pair of sprockets comprise a multi-ribbed surface.

5. The vehicle steering system transmission as in claim 1 wherein, the first belt and first pair of sprockets comprise a toothed surface.

* * * * *